United States Patent [19]
Watson et al.

[11] 4,094,192
[45] June 13, 1978

[54] METHOD AND APPARATUS FOR SIX DEGREE OF FREEDOM FORCE SENSING

[75] Inventors: Paul C. Watson, Arlington; Samuel H. Drake, Lexington, both of Mass.

[73] Assignee: The Charles Stark Draper Laboratory, Inc., Cambridge, Mass.

[21] Appl. No.: 724,623

[22] Filed: Sep. 20, 1976

[51] Int. Cl.² .............................................. G01L 5/16
[52] U.S. Cl. ................... 73/133 R; 73/1 B
[58] Field of Search ................. 73/133 R, 147; 235/151.3; 75/1 B

[56] References Cited

U.S. PATENT DOCUMENTS

| | | | |
|---|---|---|---|
| 3,100,990 | 8/1963 | Dimeff | 73/147 |
| 3,618,376 | 11/1971 | Shull et al. | 73/133 R |
| 3,640,130 | 2/1972 | Spescha et al. | 73/133 R |
| 3,956,930 | 5/1976 | Shoberg | 73/133 R |

OTHER PUBLICATIONS

J. D. Smith et al., Journal Mechanical Engineering Science, "A Six Component Dynamometer", vol. 12, No. 2, pp. 143–145, 4/1970.

VD1-Berichte Nr. 176, 1972, pp. 107–118.

*Primary Examiner*—Charles A. Ruehl
*Attorney, Agent, or Firm*—Weingarten, Maxham & Schurgin

[57] ABSTRACT

A method for deriving the components of a load force applied to a force sensor, and a force sensor structure adapted for use with this method. A plurality of strain gauges are attached to the force sensing structure in such a manner that at least one strain gauge will provide an output indication of any force which may be applied to the sensor. By properly calibrating the sensor and processing the strain gauge outputs, the components of a load force applied to the sensor may be expressed in a Cartesian or other selected coordinate system without the need to provide for decoupling of the force components within the force sensor.

28 Claims, 6 Drawing Figures

METHOD AND APPARATUS FOR SIX DEGREE OF FREEDOM FORCE SENSING

FIELD OF THE INVENTION

This invention relates to force measuring instruments and in particular to six degree of freedom force sensors.

BACKGROUND OF THE INVENTION

It is frequently necessary to measure the forces acting upon a particular structure. Examples include measuring forces induced in objects while they are being acted on by manufacturing processes such as cutting or assembly, or forces exerted by normal or handicapped people in the course of their activities. Usually, the forces acting upon the structure are expressed in terms of a three-dimensional coordinate system, and may be completely expressed in terms of six components, including three linear force components along each of three mutually orthogonal axes and three torque components about the same set of axes. Devices for measuring such a set of six forces are termed "six degree of freedom sensors."

The conventional approach to six degree of freedom force sensor design is to use a structure having various hinges, pivots, or other mechanisms so that the components of the forces applied to the structure are decoupled by the action of the structure itself with the result that each of the six components of applied force may be measured independently of the other forces applied to the structure by one or more strain gauges appropriately located on the structure. Due to the difficulty of constructing mechanical structures which completely decouple the different forces, and since this approach requires knowing all of the dimensions and elasticities of the structure to an extremely high degree of accuracy, the cost and complexities of these types of structures tends to be high, and accurate measurements are difficult to obtain from them. Typically, force sensors of these types, as exemplified by U.S. Pat. Nos. 3,613,443 and 3,618,376, are made up of complicated mechanical structures requiring a very large number of strain gauges, 20 to 40 strain gauges being typical. Alternatively, specialized sensors having individual outputs for forces measured along each of three orthogonal axes may be employed, as shown in U.S. Pat. No. 3,640,130.

SUMMARY OF THE INVENTION

The present invention includes a system for processing outputs from strain gauges attached to a structure to derive the desired force and torque components in an orthogonal three-axis coordinate system. A preferred structure for sensing forces is described, although the novel system may be utilized with practically any desired structure. The signal processing required is simple and may be implemented by means of an analog or digital processor. The preferred structure described has advantages over previously known structures in that it is very simple and reliable, having no joints or bearings; and the dimensions and elasticities of the structure need not be known. As few as six strain gauges may be employed. High accuracy readings may be obtained with a very high degree of decoupling between readings along the respective axes.

DESCRIPTION OF THE DRAWINGS

These and other advantages of the invention will become more apparent on reading the description of the preferred embodiment below with reference to the accompanying drawings of which.

DETAILED DESCRIPTION OF THE PREFERRED EMBODIMENT

Figure 1:
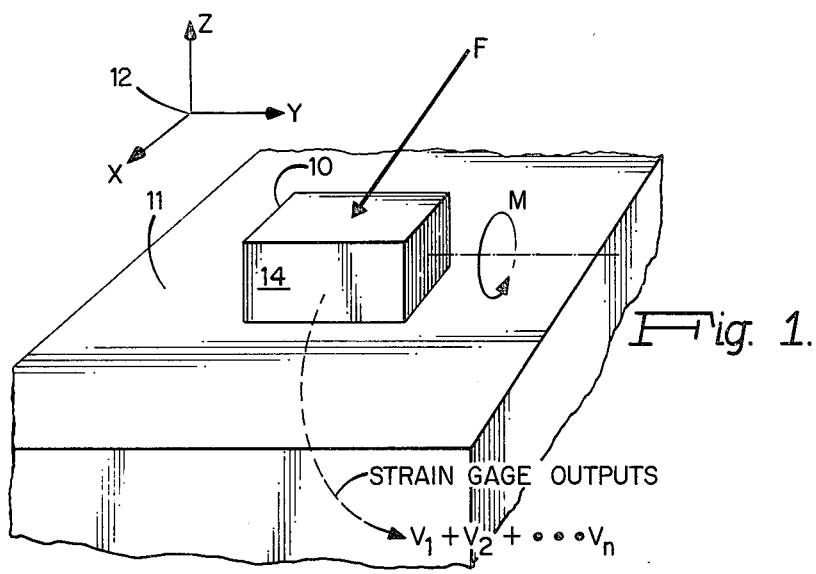
FIG. 1 is a simplified representation of a force sensor useful in explaining the principles of operation of the invention.

Before explaining the details of the novel force sensing system of the present invention, it will be helpful to review the basic functioning and principles of operation of force sensing systems in general. Referring to FIG. 1, there is shown a structure 10. While this structure is schematically shown in FIG. 1 as a cube, its exact dimensions and configuration are unimportant to the following discussion. Acting upon this structure 10 is a linear force F of arbitrary direction and magnitude. Similarly, acting on structure 10 is a torque or moment M of arbitrary magnitude about an axis arbitrarily oriented with respect to structure 10. Force F and moment M will be referred to collectively as the load in the following discussion.

Typically, structure 10 is attached to a fixed object, represented in FIG. 1 by surface 11. Force F and moment M are applied to structure 10 via a test member mechanically affixed to structure 10. Any force experienced by the test member is transmitted through structure 10 to surface 11. By measuring the stresses in structure 10, the forces applied to the test member may be determined.

In response to these input loads, structure 10 deforms slightly, producing outputs from various strain gauges or other strain measuring devices which are located on and in structure 10. These outputs may be, for example, voltages representative of the strains measured by each of the strain gauges and are shown in FIG. 1 by the terms $v_1$, $v_2$, etc. As indicated in FIG. 1, there are $n$ output voltages corresponding with $n$ different strain gauges located in structure 10.

Generally, it is desired to express force F and moment M in terms of a three-dimensional XYZ Cartesian coordinate system 12. Thus, it is necessary to separate force F and moment M into components corresponding with the X, Y and Z directions. Prior art systems have attempted to configure structure 10 and the placement of strain gauges therein such that the forces and moments applied to structure 10 are mechanically decoupled, with the result that each strain gauge has an output which is a function of only one desired component. Ideally, only six output voltages $v_1$ through $v_6$ would be needed, each of the outputs corresponding with the force or moment along or about one of the three orthogonal axes. In practice, it has been necessary to instrument structure 10 with large numbers of strain gauges whose outputs are combined to produce the six desired components. Furthermore, the configurations required for structure 10 in such systems are very complicated and costly to construct.

The present invention is concerned with providing an expression of the load applied to a structure in terms of three linear forces and three moments about a selected set of three orthogonal axes without requiring the complicated structures and instrumentation of prior art systems. This is done in the following manner.

A structure 10 is instrumented as shown in FIG. 1 with fixed strain gauges to provide a force sensor 14. In the preferred embodiment, only six strain gauges are required, although the invention is applicable to systems containing more than six strain gauges. While two preferred embodiments for the force sensor are described below, the exact configuration of structure 10 and the location of strain gauges thereupon is not important, as long as certain requirements are met. The requirements upon structure 10 and the associated strain gauges are that structure 10 is a stable, elastic body, and the strain gauges are so located such that every non-zero input load produces some change in the output from at least one of the strain gauges. While not absolutely essential, it is desirable that the strain gauges are so placed that no one component of input force be favored over other components in terms of the magnitude of strain gauge response to a unit load.

Under the above conditions, linearity and superposition will apply to the stresses and strains within structure 10 and to the strain gauge outputs resulting from input loads. Then the following matrix equation may be written:

$$V = HF + B \qquad (1)$$

where V equals the output voltage vector, H is called the transfer matrix, F equals the input force vector, and B is a vector representing any biases, for example resulting from gravity, or offsets in the transducer outputs. If B is measured and subtracted, the result is:

$$V = HF \qquad (2)$$

When there are six strain gauges, equation (2) takes the form:

$$\begin{bmatrix} v_1 \\ v_2 \\ \vdots \\ v_6 \end{bmatrix} = \begin{bmatrix} h_{11} \cdots h_{16} \\ \vdots \quad \vdots \\ h_{61} \cdots h_{66} \end{bmatrix} \begin{bmatrix} f_1 \\ f_2 \\ \vdots \\ f_6 \end{bmatrix} \qquad (3)$$

The procedure for obtaining matrix H will be discussed later.

Once matrix H has been found, any force may be determined from voltage readings V and the premeasured bias voltages B by the equation:

$$F = H^{-1}(V-B) \qquad (4)$$

where $H^{-1}$ is the inverse of matrix H. Matrix H will always have an inverse if the strain gauge outputs form a linearly independent set.

It should be appreciated that the components $f_1$ through $f_6$ of the force vector F may be arbitrarily selected. The only restriction on the components $f_1$ through $f_6$ is that their directions of application be so selected that every non-zero load on the sensor is expressible by a combination of these six components. Of course $f_1$ through $f_6$ are most conveniently composed of three forces and three moments about the XYZ Cartesian axes.

In cases where more than six strain gauges are used, equation (2) becomes:

$$\begin{bmatrix} v_1 \\ v_2 \\ \vdots \\ v_n \end{bmatrix} = \begin{bmatrix} h_{11} h_{12} \cdots h_{16} \\ \vdots \quad \vdots \\ h_{n1} \cdots h_{n6} \end{bmatrix} \begin{bmatrix} f_1 \\ f_2 \\ \vdots \\ f_6 \end{bmatrix} \qquad (5)$$

The force may then be determined from voltage readings V and the premeasured bias voltage B by the equation:

$$F = H^*(V-B) \qquad (6)$$

where $H^*$ is the pseudo-inverse of H given by:

$$H^* = (H^T H)^{-1} H^T \qquad (7)$$

where $H^T$ is the transpose of H.

Returning to equation (3), matrix H may be determined by applying a number of known calibration forces, which may include forces and/or moments, as inputs to structure 10 and measuring the strain gauge output voltages for each calibration force. The minimum required number of calibration forces is six. The following calibration procedure is used to calculate H.

A set of calibration load vectors $F_1, F_2, \ldots, F_6$ is first selected with the property that these loads form a linearly independent set of 6 × 1 vectors. Second, each load $F_i$ is applied to the sensor, and the corresponding strain gauge outputs are measured. The bias vector B is subtracted from this output and the result recorded as vector $V_i$. Each pair of vectors $V_i$ and $F_i$ satisfies equation (3): $V_i = HF_i$. When all six input loads $F_i$ have been applied and the corresponding $V_i$ recorded, they may be combined into a matrix 0 by grouping the six vectors $V_i$ into the columns of 0:

$$0 = [V_1 V_2 \ldots V_6] \qquad (8)$$

and a matrix L by grouping the six vectors $F_i$ into the columns of L in the same order as the vectors $V_i$ form 0:

$$L = [F_1 F_2 \ldots F_6] \qquad (9)$$

Then the following equation may be written, utilizing equation (3):

$$0 = HL \qquad (10)$$

Since matrix L is square, 6 × 6, and made, by design, of linearly independent columns, L has an inverse. Thus, matrix H may be determined by solving the equation:

$$H = 0L^{-1} \qquad (11)$$

using standard linear algebra techniques.

While, in most cases, the components $f_1$ through $f_6$ of the force vector F will be the forces and moments associated with an orthogonal axis system as described above, it should be appreciated from equation (3) that any other set of axes with a corresponding set of component vectors may be chosen as the coordinate system in which the output is expressed, as long as these axes form a linearly independent set. In such a case, the calibration procedure is similar to that described above.

The above procedure is greatly simplified if the calibration loads are chosen each to be forces along or torques about one and only one axis of a Cartesian XYZ coordinate frame.

In that case, matrix L takes the simple form:

$$L = \begin{bmatrix} f_1 & 0 & 0 & 0 & 0 & 0 \\ 0 & f_2 & 0 & 0 & 0 & 0 \\ 0 & 0 & f_3 & 0 & 0 & 0 \\ 0 & 0 & 0 & f_4 & 0 & 0 \\ 0 & 0 & 0 & 0 & f_5 & 0 \\ 0 & 0 & 0 & 0 & 0 & f_6 \end{bmatrix} \quad (12)$$

The values $h_{11}$ through $h_{61}$ of matrix H may then be easily determined by dividing each element of vector $V_1$ by $f_1$, the values $h_{12}$ through $h_{62}$ by dividing $V_2$ by $f_2$, and so on.

Figure 2:
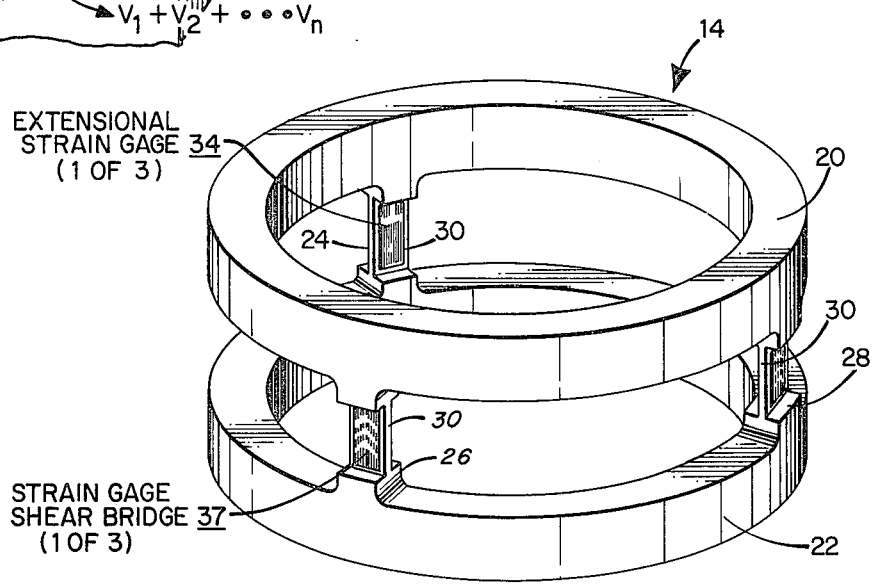
FIG. 2 is a representation of a force sensor particularly adapted for use with the invention.

Referring to FIG. 2, there is shown an embodiment for force sensor 14 that has been found to be particularly suitable for use with the described system of force sensing. The force sensor shown in FIG. 2 is composed of a top cylindrical section 20 and a bottom cylindrical section 22 interconnected by three intermediate connecting sections 24, 26, and 28. The central portion 30 of each of the connecting sections 24-28 is much narrower in cross section than the remaining parts of the sensor. This causes deformations in the sensor resulting from an applied load to be concentrated in the narrow sections 30.

Applied to the outside surface of each narrow section 30 is a strain gauge shear bridge 32 for sensing shear forces in the narrow section 30 to which it is attached. Bonded to the inner surface of each of the narrow sections 30 are extensional strain gauges 34 for measuring vertical strains occurring in the narrow sections 30. These six sensors provide output signals from which the components of any force applied to the structure 10 may be determined. Other types of strain gauges or other methods of strain measurement could be used.

Figure 3:
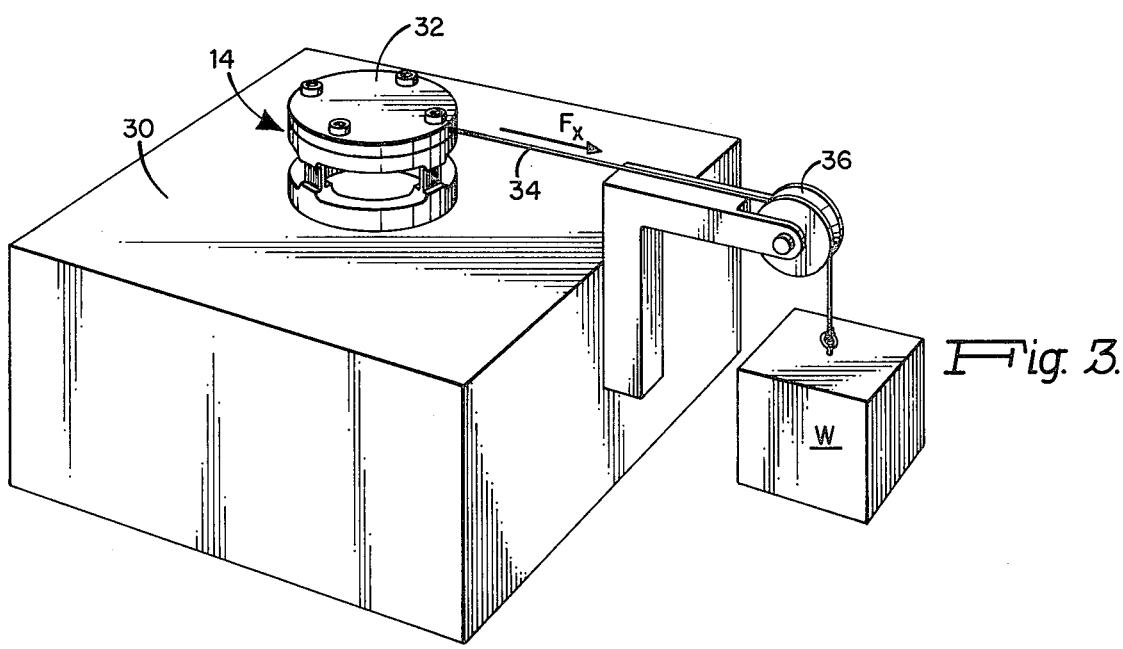
FIG. 3 shows the application of a unidirectional calibration force to the force sensor of FIG. 2.

Referring to FIG. 3, there is shown a calibration force being applied to the sensor 14 of FIG. 2 for determining the transfer matrix H. In FIG. 3, a unidirectional force $F_x$ is applied to sensor 14 along the X axis. It should be noted that the choice of orientation of the axes about sensor 14 is completely arbitrary, and the direction chosen for the X axis in FIG. 3 is for illustrative purposes only. Sensor 14 is attached on the bottom to a stationary surface 30. The top of sensor 14 has a plate 32 attached thereto. The stresses applied to sensor 14 are applied through this plate 32 so that they are applied to the entire top 20 of sensor 14. In the simplified calibration apparatus shown in FIG. 3, a wire 34 is attached to the plate 32 along which a force is applied by weight W and pulley 36, as shown.

In response to the applied force $F_x$, the strain gauges attached to force sensor 14 produce output signals representative of the measured strains. Referring to equation (3), it can be seen that if $f_1$ is a vector force in the X direction, the values $h_{11}$ through $h_{61}$ of transfer matrix H are given directly by the outputs from the sensors, once the bias has been removed and these outputs are normalized with respect to the force applied by weight W. A similar procedure is performed to calibrate the remaining forces and moments: $F_y$, $F_z$, $M_x$, $M_y$ and $M_z$, as described above. When these six calibration forces have been applied, and the resulting strain gauge outputs measured, transfer matrix H has been uniquely identified.

As stated above, it may sometimes be impractical to apply calibration forces composed of single components. In such cases, calibration forces having more than one non-zero component are applied and the resulting outputs from the strain gauges measured. From these calibration procedures, the transfer matrix H may be calculated using conventional linear algebra methods as described above.

Figure 4:
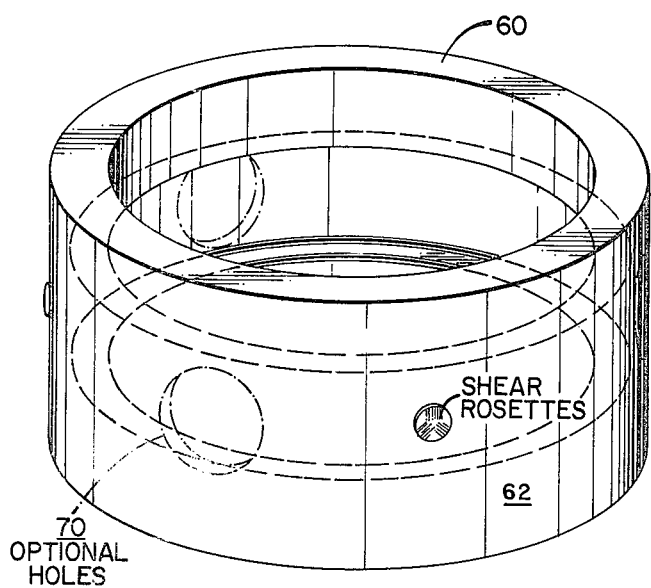
FIGS. 4 and 4A show an alternate embodiment of a force sensor in accordance with the present invention.
Figure 4A:
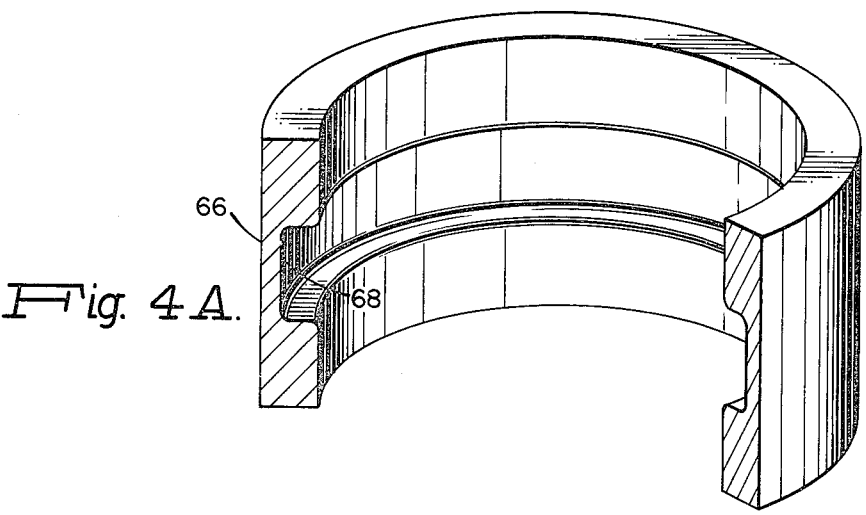

Referring to FIGS. 4 and 4A, there is shown an alternate embodiment of force sensor 14. This force sensor consists basically of a cylindrical tube 60, the top and bottom ends of the tube serving as the top and bottom surfaces between which loads are applied. Arranged about the outside surface of structure 60 are three strain gauge rosettes 62 placed 120° apart. The rosettes are connected to yield two outputs each, shear and longitudinal extension. As shown in FIG. 4A, an annular section 66 of wall 60 to which the strain gauges are attached is of reduced cross section so that the strains produced by the external stresses are concentrated at the locations of the strain gauges. Optional holes 70 may be formed in structure 60, if desired, to further concentrate the internal strains in structure 60 at the strain gauge locations. The force sensor configuration shown in FIG. 4 has the advantages of simple construction. This configuration has the disadvantage that it may be somewhat less sensitive than the structure shown in FIG. 1, unless section 66 is reduced in cross section and holes 70 are provided.

The configurations shown in FIGS. 2 and 4 for the force sensor are only two of many different configurations which may be utilized. A six degree of freedom force sensor need only mathematically span the six-dimensional input load space. That is every non-zero load should produce a non-zero change in at least one of the strain gauge outputs. Many configurations exist which will accomplish this and which both concentrate the strain sufficiently at the measurement locations and do not favor unduly one or more of the force components; and the explanation of the preferred embodiments shown in FIGS. 2 and 4 is not to be construed as a limitation on the present invention.

Figure 5:
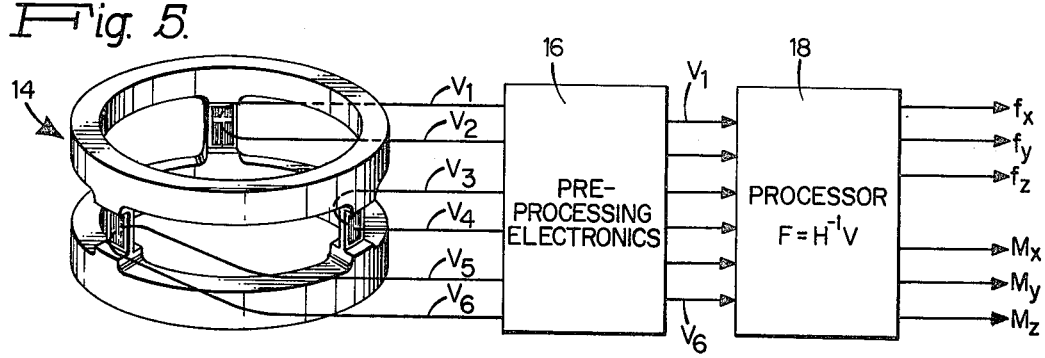
FIG. 5 shows the force sensor of FIG. 2 in conjunction with apparatus for processing the force sensor outputs.

Normally, force sensor 14 will be utilized in conjunction with an electronic processor as shown in FIG. 5. In FIG. 5, force sensor 14 contains six strain gauges as described above with reference to FIG. 2. The output voltages $v_1$ through $v_6$ from these strain gauges are applied to preprocessing electronics 16. Preprocessing electronics 16 perform any necessary amplification, filtering, and isolation operations upon each of the signals coming from force sensor 14. Additionally, preprocessing electronics 16 may convert each of the strain gauge analog outputs $v_1$ through $v_6$ into a digital representation thereof, as required, for further processing.

From preprocessing electronics 16, six signals representative of the output from the six strain gauges in force sensor 14 are applied to a processor 18. The coefficients of the transfer matrix H and the bias and offset errors B of the strain gauges have previously been entered into processor 18. Alternatively, these values may be calculated by the processor by following the calibration procedure described above. In response to the signals representative of the outputs from the six strain gauges, processor 18 solves equation (4) (or equation (6) if there are more than six strain gauges) to produce outputs representative of the three linear force components and three moments describing the input load applied to sensor 14, as shown in FIG. 5.

Processor 18 may be either an analog processor or it may be a properly programmed digital processor, such as a Data General Nova minicomputer. The design and/or programming of such processors to perform the necessary functions and calculations for producing the desired output signals will be obvious to one of ordinary skill in the art in light of the present explanation and teaching. A representative program for performing the desired calculations in a Data General Nova minicomputer is included as an appendix to this application.

There has been described a novel six degree of freedom force sensor system using data reduction to decouple the desired forces. By properly calibrating the system, the transfer matrix required to transform the strain gauge outputs into the proper force components may be easily computed. The strain gauges may be easily located on the sensor at the discretion of the designer to suit his needs, provided only that every non-zero load produce a non-zero change in the output from at least one of the gauges. Additionally, several alternative embodiments of a force sensor particularly suited for use with the present invention have been described. Various additions and modifications to the present invention may occur to those of ordinary skill in the art in applying the teachings disclosed therein to different applications, which additions and modifications do not fall outside the scope of the present invention. Accordingly, the invention is only to be limited as indicated in the appended claims.

What is claimed is:

1. A six-degree of freedom force sensor, comprising:
   a first section;
   a second section;
   three physically distinct and separate intermediate sections spaced apart from one another, each of the intermediate sections being disposed between and connecting the first and second sections;
   means for measuring shear strain in each of the intermediate sections and producing an output signal representative thereof; and
   means for measuring extensional strain in each of the intermediate sections and producing an output signal representative thereof.

2. The force sensor of claim 1 wherein the first and second sections are generally annular in shape and are arranged one above the other about the same axis.

3. The force sensor of claim 1 wherein the intermediate sections are distributed between the first and second sections symmetrically around the peripheral edges thereof.

4. The force sensor of claim 1 further including:
   processing means responsive to the output signals from each of the measuring means for producing signals representative of components of stresses applied to the force sensor.

5. The force sensor of claim 4 wherein the signals representative of the strains include signals representative of three forces respectively along and three moments respectively about three mutually orthogonal axes.

6. A six-degree of freedom force sensor, comprising:
   a first section;
   a second section;
   the first and second sections being generally annular in shape and arranged one above the other about the same axis;
   three intermediate sections connecting the first and second sections;
   means for measuring shear strain in each of the intermediate sections and producing an output signal representative thereof; and
   means for measuring extensional strain in each of the intermediate sections and producing an output signal representative thereof.

7. A six-degree of freedom force sensor, comprising:
   a first section;
   a second section;
   three intermediate sections connecting the first and second sections;
   means for measuring shear strain in each of the intermediate sections and producing an output signal representative thereof;
   means for measuring extensional strain in each of the intermediate sections and producing an output signal representative thereof;
   the signals representative of the strains including signals representative of three forces respectively along and three moments respectively about three mutually orthogonal axes; and
   processing means responsive to the output signals from each of the measuring means for producing signals representative of components of stresses applied to the force sensor, including:
     means for solving the equation $F = H^*V$, where H is a transfer matrix relating the measuring means output signals to forces applied to the force sensor producing such output signals, $H^*$ is the pseudo inverse of H, and V is a vector whose elements are the output signals from the measuring means, to determine F, a vector whose elements are components of the force applied to the forced sensor.

8. A method for measuring an unknown load applied to a structure, including the steps of:
   applying to the structure a plurality of strain measuring means for producing output signals representative of strain measured thereby, the strain measuring means being applied so that there is no non-zero load which, when applied to the structure, results in zero change in the output signals from all of the strain measuring means;
   applying at least six known calibration forces to the structure, the calibration forces being chosen such that there exists no load which cannot be expressed in terms of one or more of the calibration forces;
   measuring each of the output signals produced by each of the strain measuring means in response to each of the calibration forces;
   calculating a transfer matrix H defined by the equation $V = HF$ as determined by the six calibration forces and the corresponding strain measuring means output signals resulting therefrom, where F is a vector whose elements are the components of a force applied to the force sensor and V is a vector whose elements are the strain measuring means output signals produced in response thereto;
   applying the unknown load to the structure;
   measuring each of the output signals produced by each of the strain measuring means in response to the unknown load; and
   computing the unknown force by solving the equation $F' = H^{-1}V'$ where H is the previously calculated transfer matrix, $V'$ is a vector whose elements are the strain measuring means output signals produced in response to the unknown load, and $F'$ is a vector whose elements are the components of the unknown load.

9. The method of claim 8 wherein the step of applying calibration forces includes respectively applying three forces along and three moments about three mutually orthogonal axes;
and wherein the elements of vectors F and F' each include three forces along and three moments about the three mutually orthogonal axes.

10. The method of claim 8 wherein the steps of measuring include analog-to-digital converting each of the output signals from each of the strain measuring means to produce a digital representation of the strain output.

11. The method of claim 10 wherein the step of computing includes:
programming a digital computer to solve the equation $F' = H^{-1}V'$;
entering the previously calculated transfer matrix into the digital computer;
applying the A/D converted strain measuring means output signals to the digital computer for entry thereof; and
solving the equation $F' = H^{-1}V'$ in the computer to determine the unknown force F'.

12. The method of claim 11 wherein the step of calculating includes:
programming a digital processor to calculate the transfer matrix H from the six calibration forces and the corresponding strain measuring means output signals resulting therefrom;
entering into the digital processor signals representative of the vectors describing each of the calibration forces;
applying the converted strain measuring means output signals produced in response to the application of the six calibration forces to the digital process for entry thereof; and
calculating the transfer matrix H in the digital processor.

13. The method of claim 12 wherein the step of applying calibration forces includes respectively applying three forces along and three moments about three mutually orthogonal axes; and
wherein the elements of vectors F and F' include three forces along and three moments about the three mutually orthogonal axes.

14. The method of claim 8 further including the step of removing any bias or offset components present in the strain measuring means output signals.

15. A method for measuring an unknown load applied to a structure, including the steps of:
applying to the structure a plurality of strain measuring means for producing output signals representative of strain measured thereby, the strain measuring means being applied so that there is no non-zero load which, when applied to the structure, results in zero change in the output signal from all of the strain measuring means;
determining a transfer matrix H defined by the equation $V = HF$, where F is a vector whose elements are the components of a force applied to the force sensor and V is a vector whose elements are the strain measuring means output signals produced in response thereto;
applying the unknown load to the structure;
measuring each of the output signals produced by each of the strain measuring means in response to the unknown load; and
computing the unknown force by solving the equation $F = H^{-1}V'$ where H is the previously determined transfer matrix, V' is a vector whose elements are the strain measuring means output signals produced in response to the unknown load, and F' is a vector whose elements are the components of the unknown load.

16. A six-degree of freedom force sensor, comprising:
a first section;
a second section;
the first and second sections being generally annular in shape and arranged one above the other about the same axis;
at least three intermediate sections connecting the first and second sections;
means for measuring shear strain in each of the intermediate sections and for producing an output signal representative thereof; and
means for measuring extensional strain in each of the intermediate sections and for producing an output signal representative thereof.

17. The force sensor of claim 16 wherein the intermediate sections are evenly distributed about the circumference of the annular first and second sections.

18. The force sensor of claim 17 wherein the means for measuring shear strain includes a shear strain gauge attached to each intermediate section; and
wherein the means for measuring extensional strain includes an extensional strain gauge attached to each intermediate section.

19. The force sensor of claim 17 wherein the cross sectional area of each of the intermediate sections is reduced so that the stresses in the force sensor are concentrated in the reduced area sections; and
wherein the means for measuring shear strain and the means for measuring extensional strain measure strains in the reduced cross sectional area of the intermediate sections.

20. A six-degree of freedom force sensor, comprising:
a first section;
a second section;
at least three intermediate sections connecting the first and second sections;
means for measuring shear strain in each of the intermediate sections and for producing an output signal representative thereof;
means for measuring extensional strain in each of the intermediate sections and for producing an output signal representative thereof; and
processing means responsive to the output signals from each of the measuring means for producing signals representative of components of stresses applied to the force sensor, including:
means for solving the equation $F = H^*V$, where H is a transfer matrix relating the measuring means output to forces applied to the force sensor producing such outputs, $H^*$ is the pseudo-inverse of H, and V is a vector whose elements are the output signals from the measuring means, to determine F, a vector whose elements are components of the force applied to the force sensor.

21. Apparatus for measuring an unknown load applied to a structure, comprising:
a plurality of strain measuring means, attached to the structure, for producing output signals representative of strain measured thereby, the strain measuring means being attached to the structure so that there is no non-zero load which, when applied to the structure, results in zero change in the output signals from all of the strain measuring means;

means for applying at least six known calibration forces to the structure, the calibration forces being chosen such that there exists no load which cannot be expressed in terms of one or more of the calibration forces;

means for measuring each of the output signals produced by each of the strain measuring means in response to each of the calibration forces;

means for calculating a transfer matrix H defined by the equation $V = HF$ as determined by the six calibration forces and the corresponding strain measuring means output signals resulting therefrom, where F is a vector whose elements are the components of a force applied to the force sensor and V is a vector whose elements are the strain measuring means output signals produced in response thereto;

means for applying the unknown load to the structure;

the means for measuring being further responsive to measure each of the output signals produced by each of the strain measuring means in response to the unknown load; and means for computing the unknown force, including means for solving the equation $F' = H^{-1}V'$ where H is the transfer matrix, V' is a vector whose elements are the strain measuring means output signals produced in response to the unknown load, and F' is a vector whose elements are the components of the unknown load.

22. The apparatus of claim 21 wherein the means for applying calibration forces includes means for respectively applying three forces along and three moments about three mutually orthogonal axes;

and wherein the elements of vectors F and F' each include three forces along and three moments about the three mutually orthogonal axes.

23. The apparatus of claim 21 wherein the means for measuring includes an analog-to-digital converter for converting each of the output signals from each of the strain measuring means to a digital representation of the strain.

24. The apparatus of claim 23 wherein the means for computing includes:

a digital computer programmed for solving the equation $F' = H^{-1}V'$;

means for entering the transfer matrix into the digital computer; and means for applying the analog-to-digital converted strain measuring means output signals to the digital computer for entry thereof;

the equation $F' = H^{-1}V'$ being solved in the computer to determine the unknown force F'.

25. The apparatus of claim 24 wherein the means for calculating includes:

a digital processor programmed to calculate the transfer matrix H from the six calibration forces and the corresponding strain measuring means output signals resulting therefrom;

means for entering into the digital processor signals representative of the vectors describing each of the calibration forces; and means for applying the analog-to-digital converted strain measuring means output signals produced in response to the application of the six calibration forces to the digital processor for entry thereof;

the transfer matrix H being calculated in the digital processor.

26. The apparatus of claim 25 wherein the means for applying calibration forces includes means for respectively applying three forces along and three moments about three mutually orthogonal axes; and wherein the elements of vectors F and F' include three forces along and three moments about the three mutually orthogonal axes.

27. The apparatus of claim 21 further including means for removing any bias or offset components present in the strain measuring means output signals.

28. Apparatus for measuring an unknown load applied to a structure, comprising:

a plurality of strain measuring means, attached to the structure, for producing output signals representative of strain measured thereby, the strain measuring means being attached to the structure so that there is no non-zero load which, when applied to the structure, results in zero change in the output signal from all of the strain measuring means;

means for storing a transfer matrix H defined by the equation $V = HF$, where F is a vector whose elements are the components of a force applied to the force sensor and V is a vector whose elements are the strain measuring means output signals produced in response thereto;

means for applying the unknown load to the structure;

means for measuring each of the output signals produced by each of the strain measuring means in response to the unknown load; and means for computing the unknown force by solving the equation $F' = H^{-1}V'$ where H is the stored transfer matrix, V' is a vector whose elements are the strain measuring means output signals produced in response to the unknown load, and F' is a vector whose elements are the components of the unknown load.

* * * * *